US011544871B2

(12) United States Patent
Guleryuz (10) Patent No.: US 11,544,871 B2
(45) Date of Patent: Jan. 3, 2023

(54) HAND SKELETON LEARNING, LIFTING, AND DENOISING FROM 2D IMAGES

(71) Applicant: Google LLC, Mountain View, CA (US)

(72) Inventor: Onur Guleryuz, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/112,264

(22) Filed: Aug. 24, 2018

(65) Prior Publication Data
US 2019/0180473 A1   Jun. 13, 2019

Related U.S. Application Data

(60) Provisional application No. 62/598,306, filed on Dec. 13, 2017.

(51) Int. Cl.
*G06T 7/73* (2017.01)
*G06K 9/62* (2022.01)
(Continued)

(52) U.S. Cl.
CPC ............. *G06T 7/75* (2017.01); *G06F 3/017* (2013.01); *G06F 3/0304* (2013.01); *G06K 9/6255* (2013.01); *G06T 5/002* (2013.01); *G06V 40/10* (2022.01); *G06V 40/107* (2022.01); *G06T 7/60* (2013.01); *G06T 2207/20081* (2013.01); *G06T 2207/30196* (2013.01); *G06V 2201/033* (2022.01)

(58) Field of Classification Search
CPC .. G06T 7/75; G06T 7/60; G06T 5/002; G06T 2207/20081; G06T 2207/30196; G06F 3/017; G06F 3/0304; G06K 9/00362; G06K 9/00375; G06K 9/6255; G06K 2209/055
USPC .......................................... 348/77
See application file for complete search history.

(56) References Cited

U.S. PATENT DOCUMENTS 6,738,065 B1 * 5/2004 Even-Zohar ........... G06Q 30/06
345/473
8,872,899 B2   10/2014 Givon
(Continued)

OTHER PUBLICATIONS

Joo et al., "Panoptic Studio: A Massively Multiview System for Social Interaction Capture", arXiv.org, arXiv submission 1612.03153v1, Dec. 2016, 14 pages.
(Continued)

*Primary Examiner* — Matthew K Kwan (57) ABSTRACT

A processor identifies keypoints on a hand in a two-dimensional image that is captured by a camera. A three-dimensional pose of the hand is determined using locations of the keypoints to access lookup tables (LUTs) that represent potential poses of the hand as a function of the locations of the keypoints. In some embodiments, the keypoints include locations of tips of fingers and a thumb, joints that connect phalanxes of the fingers and the thumb, palm knuckles that represent a point of attachment of the fingers and the thumb to a palm, and a wrist location that indicates a point of attachment of the hand to a forearm. Some embodiments of the LUTs represent 2D coordinates of the fingers and the thumb in corresponding finger pose planes as a function of the locations of the tips of the fingers or thumb relative to the corresponding palm knuckles.

29 Claims, 11 Drawing Sheets

(51) Int. Cl.
  *G06T 5/00* (2006.01)
  *G06T 7/60* (2017.01)
  *G06F 3/03* (2006.01)
  *G06F 3/01* (2006.01)
  *G06V 40/10* (2022.01)

(56) References Cited

U.S. PATENT DOCUMENTS

| | | | |
|---|---|---|---|
| 2002/0024593 A1* | 2/2002 | Bouguet | G01B 11/2504 348/46 |
| 2009/0082701 A1* | 3/2009 | Zohar | A61B 5/103 600/595 |
| 2011/0129124 A1* | 6/2011 | Givon | G06F 3/011 382/107 |
| 2014/0039861 A1* | 2/2014 | Kawakami | G06T 19/20 703/11 |
| 2017/0193289 A1 | 7/2017 | Karmon et al. | |

OTHER PUBLICATIONS

International Search Report and Written Opinion dated Jan. 18, 2019 for corresponding International Application No. PCT/US2018/055809, 16 pages.

Guleryuz, Onur G. et al., "Fast Lifting for 3D Hand Pose Estimation in AR/VR Applications," 2018 25th IEEE International Conference on Image Processing, Oct. 7-10, 2018; 5 pages.

Howe, Nicholas R., "Silhouette Lookup for Monocular 3D Pose Tracking," Image and Vision Computing, vol. 25, No. 3; Dec. 12, 2006, pp. 331-341.

Written Opinion of the International Examining Authority dated Nov. 11, 2019 for corresponding International Application No. PCT/US2018/055809, 7 pages.

International Preliminary Report on Patentability dated Mar. 6, 2020 for International Application No. PCT/US2018/055809, 9 pages.

Office Action dated Jan. 29, 2021 for Korean Patent Application No. 10-2019-7034132, 8 pages.

Notice of Allowance dated Aug. 30, 2021 for Korean Patent Application No. 10-2019-7034132, 3 pages.

* cited by examiner

HAND SKELETON LEARNING, LIFTING, AND DENOISING FROM 2D IMAGES

CROSS REFERENCE TO RELATED APPLICATIONS

This application is related to U.S. Provisional Patent Application 62/598,306, entitled "HAND SKELETON LEARNING, LIFTING, AND DENOISING FROM 2D IMAGES" and filed on Dec. 13, 2017, the entirety of which is incorporated by reference herein.

BACKGROUND

The location of human body parts, and especially human hands, in three-dimensional (3D) space is a useful driver of numerous applications. Virtual reality (VR), augmented reality (AR), or mixed reality (MR) applications use a representation of a user's hands to facilitate interaction with virtual objects, to select items from a virtual memory, to place objects in the user's virtual hand, to provide a user interface by drawing a menu on one hand and selecting elements of the menu with another hand, and the like. Gesture interactions add an additional modality of interaction with automated household assistants such as Google Home or Nest. Security or monitoring systems use 3D representations of human hands or other body parts to detect and signal anomalous situations. In general, a 3D representation of the location of human hands or other body parts provides an additional modality of interaction or detection that is used instead of or in addition to existing modalities such as voice communication, touchscreens, keyboards, computer mice, and the like. However, computer systems do not always implement 3D imaging devices. For example, devices such as smart phones, tablet computers, and head mounted devices (HMD) typically implement lightweight imaging devices such as two-dimensional (2D) cameras.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

A 3D representation of a hand (which is referred to herein as a skeleton model) is generated in real-time from a 2D image of the hand by identifying keypoints on the hand in the 2D image and determining a 3D pose and location of the hand using locations of the keypoints to access lookup tables that represent potential 3D poses of the hand as a function of locations of the keypoints. In some embodiments, the keypoints include locations of tips of the fingers and the thumb, joints that connect phalanxes of the fingers and the thumb, palm knuckles that represent a point of attachment of each finger and the thumb to the palm of the hand, and a wrist location that indicates a point of attachment of the hand to the user's forearm. The lookup tables include finger pose lookup tables that represent 2D coordinates of each finger (or thumb) in a corresponding finger pose plane as a function of a location of the tip of the finger (or thumb) relative to the corresponding palm knuckle of the finger or thumb. Lengths of the phalanxes of the fingers and thumb are determined from a set of training images of the hand. The finger pose lookup tables are generated based on the lengths and anatomical constraints on ranges of motion of the joints that connect the phalanxes. The palm of the hand is represented as a palm triangle and a thumb triangle, which are defined by corresponding sets of vertices. The palm triangle has a vertex at the wrist location, which is opposite a triangle side that includes the palm knuckles of the fingers. The thumb triangle has a vertex at the wrist location, a vertex at the palm knuckle of the thumb, and a vertex at the palm knuckle of the index finger. Parameters that define the palm triangle and the thumb triangle are also determined from the set of training images.

In operation, a skeleton model of a hand is determined from a 2D image of the hand using 2D coordinates determined from the finger pose lookup tables and orientations of the palm triangle and the thumb triangle. The fingers and the thumbs are anatomically constrained to move within the corresponding pose planes, which have fixed orientations relative to the palm triangle and the thumb triangle, respectively. For example, the index finger in the 2D image is constrained to lie in a finger pose plane that connects the palm knuckle of the index finger to the fingertip of the index finger. The 2D coordinates of a finger in its finger pose plane are determined by accessing the corresponding finger pose lookup table using a relative location of the fingertip and the palm knuckle. A 3D pose of the fingers is then determined by rotating the 2D coordinates based on the orientation of the palm triangle. The 3D pose of the thumb is determined by rotating the 2D pose of the thumb (determined from the finger pose lookup table) based on the orientation of the thumb triangle. In some embodiments, the 3D pose of the hand is determined using noisy values of keypoints in the 2D image by determining a 3D skeleton model of the hand from the 2D image based on initial estimates of the keypoints, as discussed above. The 3D locations of the keypoints indicated by the skeleton model are modified based on projections of the 3D locations of the keypoints into an image plane along a line connecting the original 2D keypoints to a vanishing point associated with the 2D image. The modified 3D locations of the keypoints are then used to modify the skeleton model, as discussed above. The process is iterated to convergence.

Figure 1:
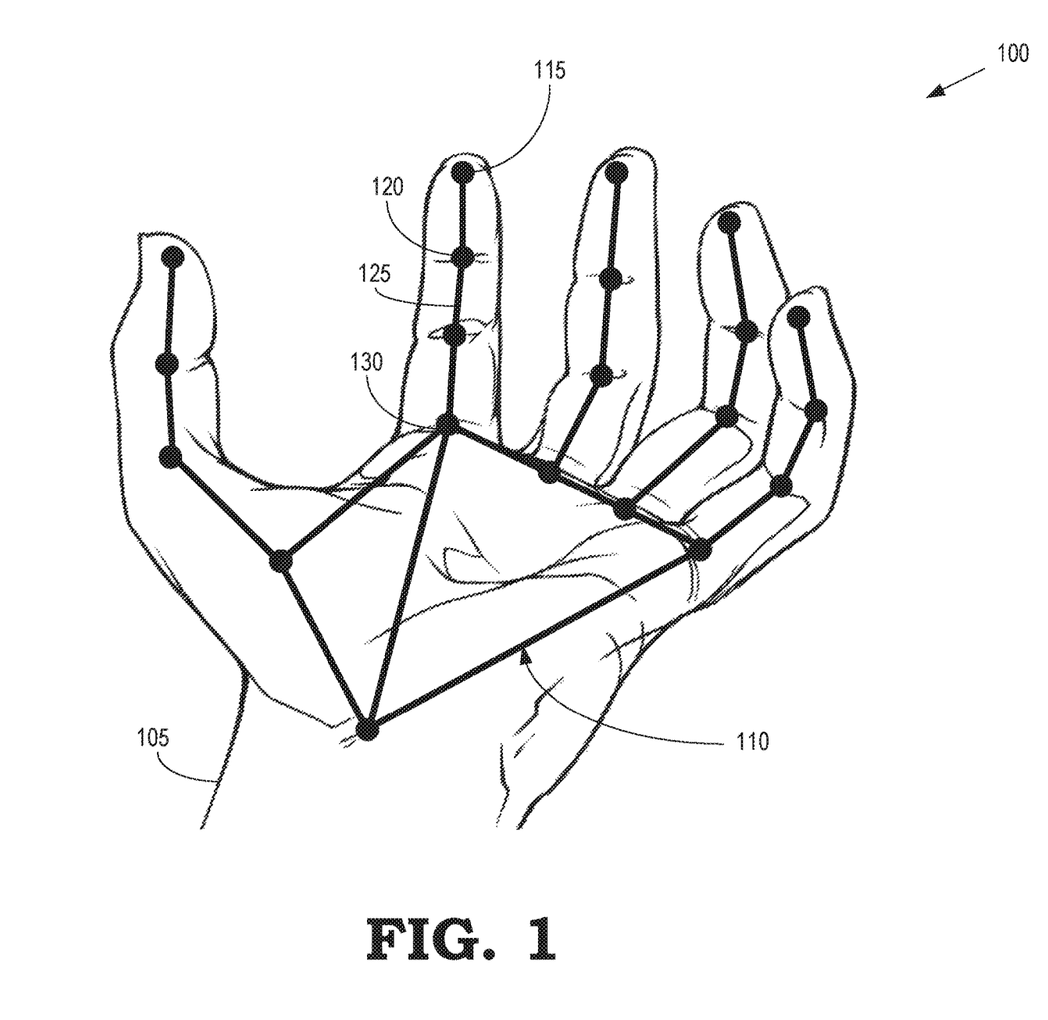
FIG. 1 is a two-dimensional (2D) image of a hand according to some embodiments.

FIG. 1 is a two-dimensional (2D) image 100 of a hand 105 according to some embodiments. The hand 105 is represented by a skeleton model 110 that models the fingers, thumb, and palm of the hand 105 as a set of interconnected keypoints. In the illustrated embodiment, the keypoints include tips 115 (only one indicated by a reference numeral in the interest of clarity) of the fingers and the thumb, joints 120 (only one indicated by a reference numeral in the interest of clarity) that connect phalanxes 125 (only one indicated by a reference numeral in the interest of clarity) of the fingers and the thumb, palm knuckles 130 (only one indicated by a reference numeral in the interest of clarity) that represent a point of attachment of each finger and the thumb to the palm of the hand, and a wrist location 135 that indicates a point of attachment of the hand to the user's forearm.

Figure 2:
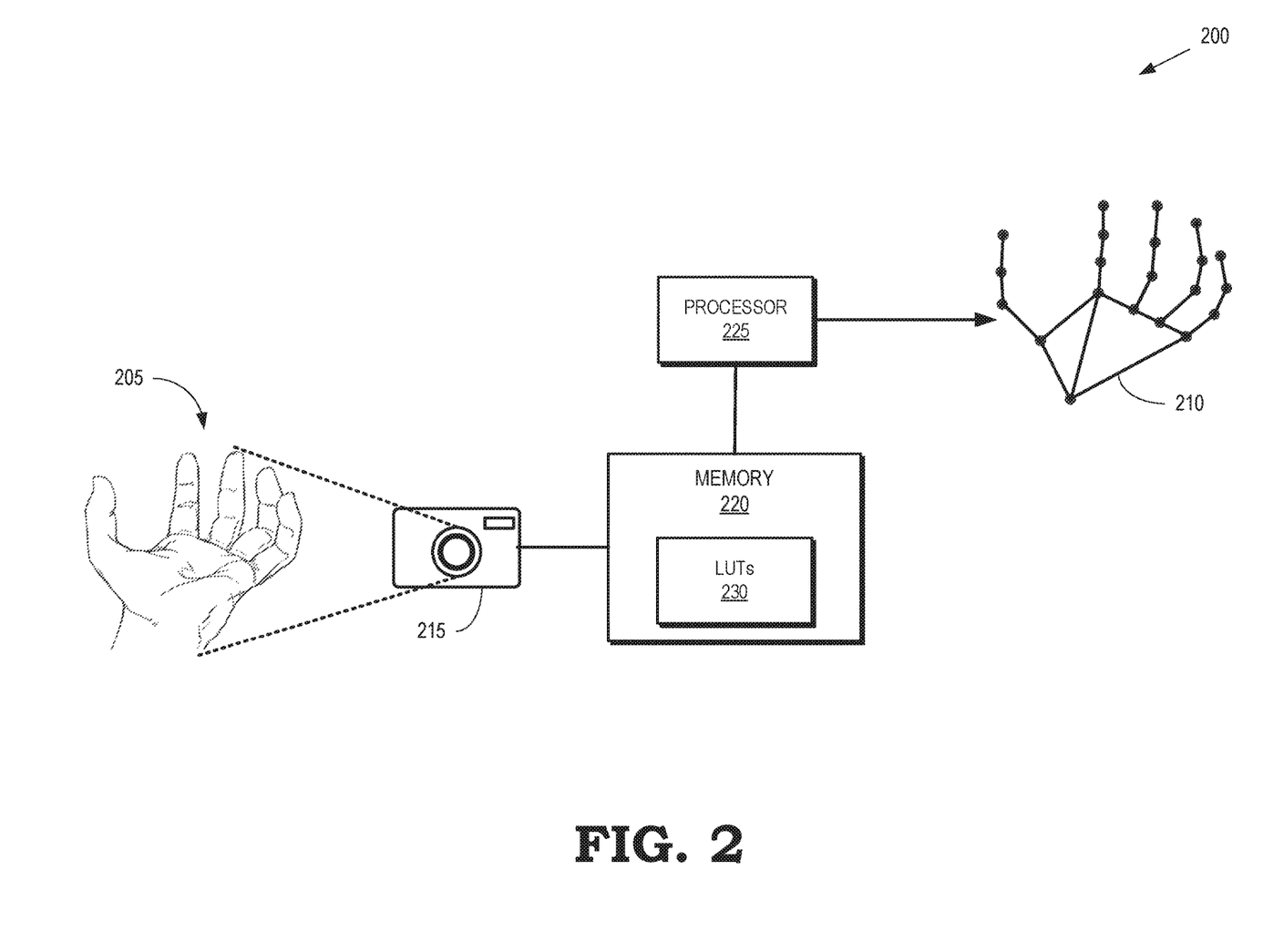
FIG. 2 is a block diagram of a processing system that is configured to acquire a 2D image of a hand and generate a 3D pose of the hand based on the 2D image according to some embodiments.

FIG. 2 is a block diagram of a processing system 200 that is configured to acquire a 2D image of a hand 205 and generate a 3D pose of the hand based on the 2D image according to some embodiments. Generating a 3D pose of the hand 205 from the 2D image is referred to as "lifting" the 3D pose of the hand 205 from the 2D image. In the illustrated embodiment, the 3D pose of the hand 205 is represented by a skeleton model 210 such as the skeleton model 110 shown in FIG. 1. In the interest of clarity, the following discussion uses the hand 205 as an example of a body part. However, some embodiments of the techniques discussed herein apply equally to lifting 3D poses of other body parts from corresponding 2D images. For example, the processing system 200 is able to lift 3D poses of feet, arms, legs, heads, other body parts, or combinations thereof from 2D images of the corresponding body parts.

The processing system 200 includes an image acquisition device such as a camera 215. Examples of image acquisition devices that are used to implement the camera 215 include red-green-blue (RGB) cameras such as cameras implemented in mobile phones or tablet computers to perform virtual reality or augmented reality applications, RGB cameras with depth estimation using one or more depth sensors, grayscale cameras such as all-in-one virtual reality devices that use stereo fisheye cameras to provide 6° of freedom, infrared cameras such as nighttime imagers or imagers on depth sensors, and the like. In some embodiments, the camera 215 is a lightweight RGB camera that is implemented in a small form factor and consumes a small amount of power. The lightweight RGB camera is therefore useful for implementation in augmented reality glasses. Some embodiments of the camera 215 are implemented as video cameras that capture sequences of images to represent movement within a scene.

The camera 215 acquires a 2D image of the hand 205 and stores information representing the 2D image in a memory 220. A processor 225 is able to access the information representing the 2D image from the memory 220 and perform operations including learning, lifting, and denoising the 2D image. The learning phase includes generating one or more lookup tables (LUTs) 230 using training images of the hand 205. For example, lengths of the phalanxes of the fingers and thumb are determined from the set of training images of the hand 205. The LUTs 230 are generated based on the lengths and anatomical constraints on ranges of motion of the joints that connect the phalanxes and then stored in the memory 220. Parameters such as the vertices that define a palm triangle and a thumb triangle are also determined from the set of training images and stored in the memory 220.

In the lifting phase, the processor 225 generates the skeleton model 210 in real-time from the 2D image of the hand by identifying keypoints on the hand 205 in the 2D image. The processor determines a 3D pose and location of the hand 205 using locations of the keypoints to access 2D coordinates of the fingers and thumb from the LUTs 230, which store the 2D coordinates of each finger and thumb as a function of a relative location of the fingertip and the palm knuckle. The processor 225 determines the 3D pose of the fingers by rotating the 2D coordinates based on the orientation of the palm triangle. The processor 225 determines the 3D pose of the thumb rotating the 2D pose of the thumb (determined from the finger pose lookup table) based on the orientation of the thumb triangle.

Some embodiments of the processor 225 are configured to perform denoising of noisy values of keypoints extracted from the 2D image of the hand 205. The denoising phase is an iterative process. Initially, the processor 225 determines a 3D pose of the hand in the 2D image by determining a 3D skeleton model of the hand from the 2D image based on initial estimates of the noisy keypoints. The processor 225 then modifies the 3D locations of the keypoints indicated by the skeleton model based on projections of the 3D locations of the keypoints into an image plane along a line connecting the original noisy keypoints to a vanishing point associated with the 2D image. The vanishing point is determined based on parameters that characterize the camera 215. The processor 225 updates the values of the noisy keypoints based on the modified 3D locations of the keypoints indicated by the skeleton model and the process is iterated until the noisy keypoints satisfy corresponding convergence criteria.

Figure 3:
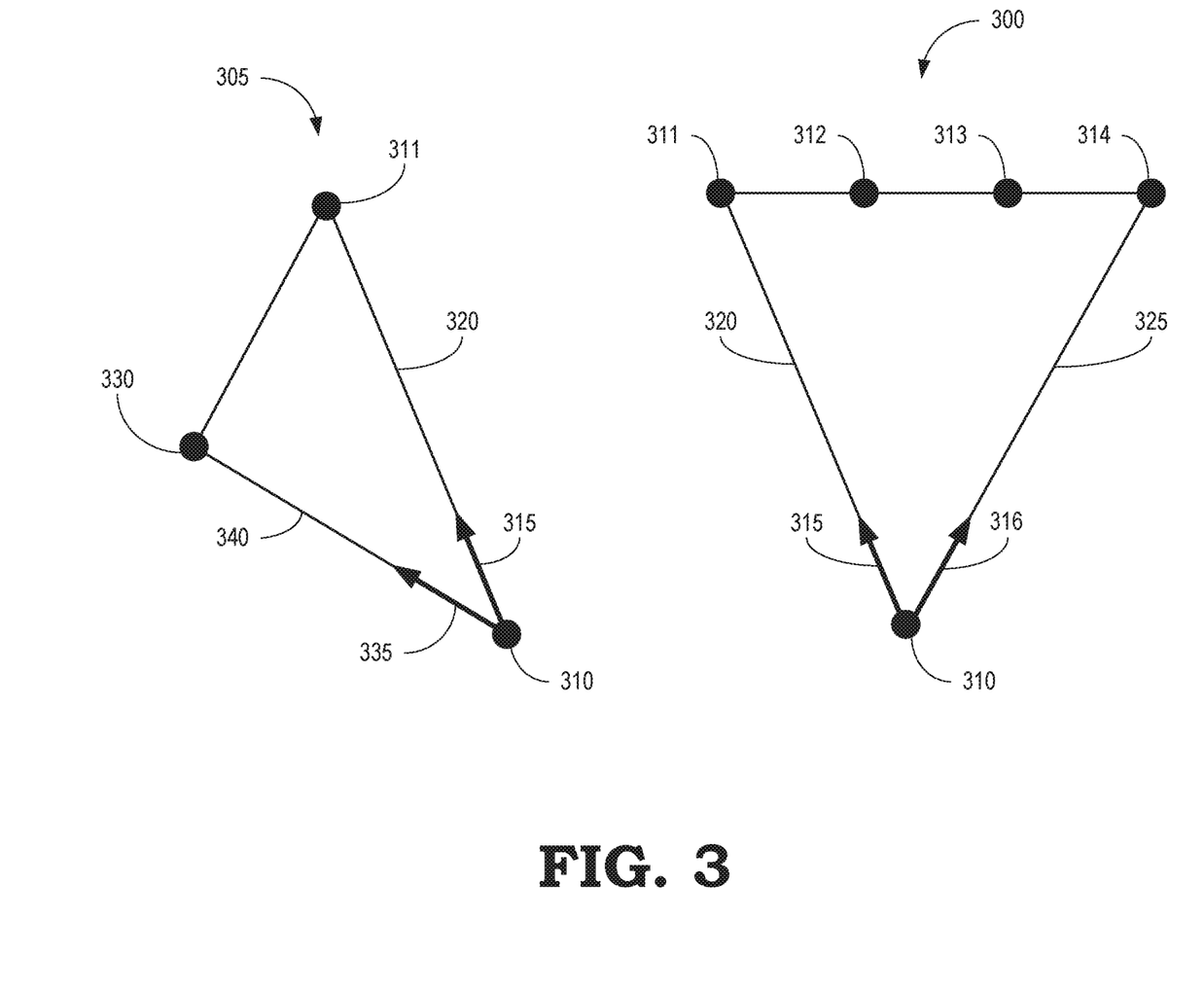
FIG. 3 illustrates a palm triangle and a thumb triangle that represent a portion of a skeleton model of a hand according to some embodiments.

FIG. 3 illustrates a palm triangle 300 and a thumb triangle 305 that represent a portion of a skeleton model of a hand according to some embodiments. The palm triangle 300 and the thumb triangle 305 represent portions of the skeleton model 110 shown in FIG. 1 and the skeleton model 210 shown in FIG. 2.

The palm triangle 300 is defined by vertices at the wrist location 310 and palm knuckles 311, 312, 313, 314 (collectively referred to herein as "the palm knuckles 311-314") of the hand. The plane that includes the palm triangle 300 is defined by unit vectors 315, 316, which are represented by the parameters $u_I$, $u_L$, respectively. A distance 320 from the wrist location 310 to the palm knuckle 311 of the index finger is represented by the parameter I and a distance 325 from the wrist location 310 to the palm knuckle 314 of the little finger (or pinky finger) is represented by the parameter L. Thus, the location of the palm knuckle 311 relative to the wrist location 310 is given by a vector having a direction $u_I$ and a magnitude of I. The location of the palm knuckle 314 relative to the wrist location 310 is given by a vector having a direction tu, and a magnitude of L. The location of the palm knuckle 312 of the middle finger is defined as:

$$\lambda_m I u_I + (1-\lambda_m) L u_L$$

where $\lambda_m$ is a parameter associated with the middle finger. The location of the palm knuckle 313 of the ring finger is defined as:

$$(1-\lambda_r)Iu_I+\lambda_r Lu_L$$

where $\lambda_r$ is a parameter associated with the ring finger. Values of the parameters that define the palm triangle 300 are learned using 2D images of the hand while the hand is held in a set of training poses.

The thumb triangle 305 is defined by vertices at the wrist location 310, the palm knuckle 311 of the index finger, and a palm knuckle 330 of the thumb. The plane that includes the thumb triangle 305 is defined by unit vectors 315, 335, which are represented by the parameters $u_I$, $u_T$, respectively. As discussed herein, the distance 320 from the wrist location 310 to the palm knuckle 311 of the index finger is represented by the parameter I. A distance 340 from the wrist location 310 to the palm knuckle 330 of the thumb is represented by the parameter T. Thus, the location of the palm knuckle 330 relative to the wrist location 310 is given by a vector having a direction $u_T$ and a magnitude of T The thumb triangle 305 differs from the palm triangle 300 in that the thumb triangle 305 is compressible and can have zero area. Values of the parameters that define the thumb triangle 305 are learned using 2D images of the hand while the hand is held in the set of training poses.

Figure 4:
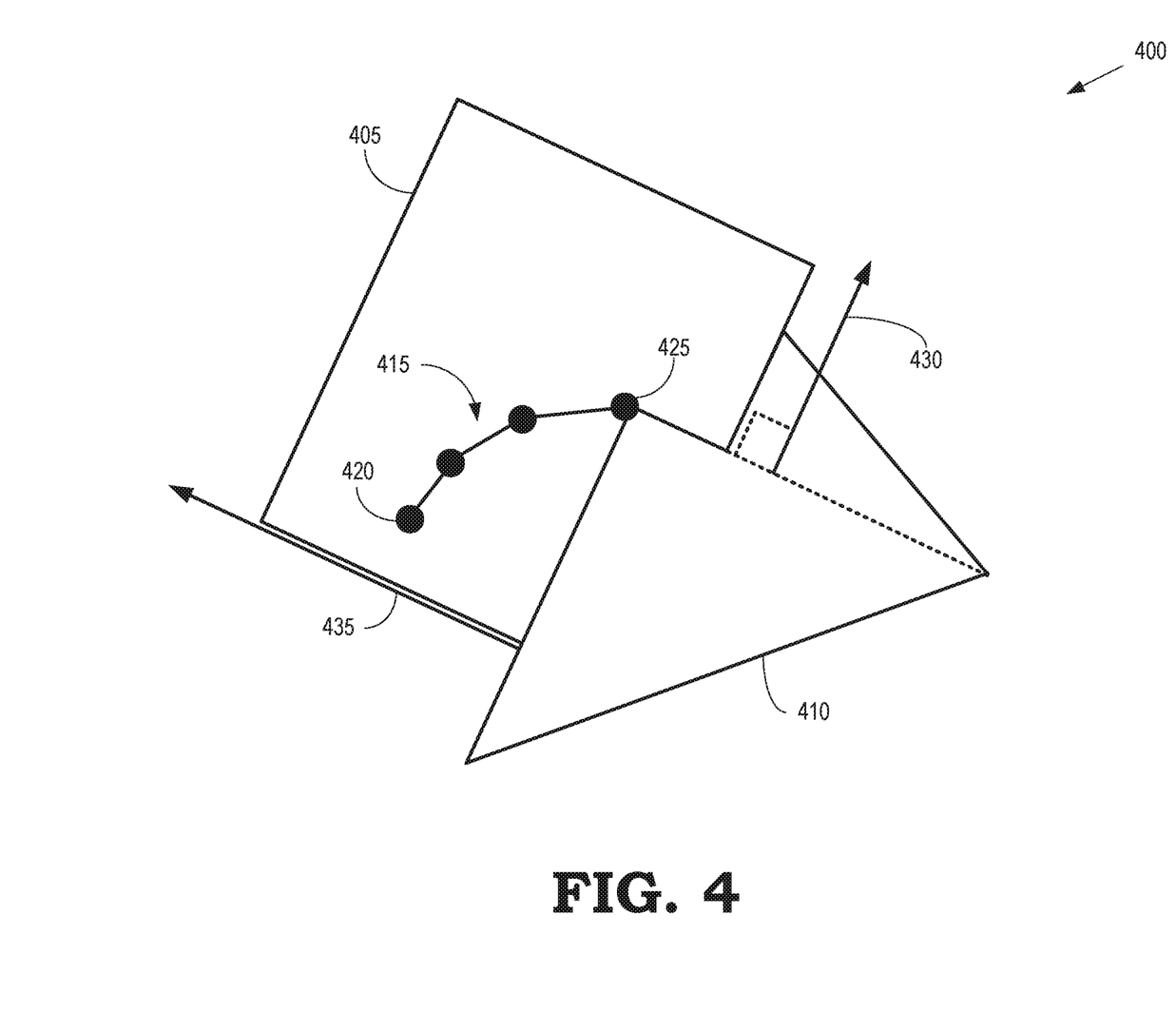
FIG. 4 illustrates a finger pose in a corresponding finger pose plane according to some embodiments.

FIG. 4 illustrates a finger pose 400 in a corresponding finger pose plane 405 according to some embodiments. The finger pose plane 405 is anatomically constrained to maintain an approximately fixed orientation with regard to the plane 410. Movement of a finger is therefore constrained to lie approximately within a corresponding finger pose plane 405. The finger pose plane 405 shown in FIG. 4 represents some embodiments of a plane of motion of an index finger, a middle finger, a ring finger, a little finger, or a thumb. If the finger pose plane 405 represents a plane of motion of an index finger, a middle finger, a ring finger, or a little finger, the plane 410 is a plane including a palm triangle of the hand, such as the palm triangle 300 shown in FIG. 3. If the finger pose plane 405 represents a plane of motion of a thumb, the plane 410 is a plane including a thumb triangle of the hand, such as the thumb triangle 305 shown in FIG. 3.

A finger of a hand is represented by a skeleton model 415 of the finger. The skeleton model 415 is characterized by a location of a fingertip 420 relative to a palm knuckle 425 of the finger. As discussed below, the relative location of the fingertip 420 relative to the palm knuckle 425 determines the 2D coordinates that define the position of the skeleton model 415 of the finger in the finger pose plane 405.

An orientation of the plane 410 is determined by a vector 430, which is defined as a vector normal to the plane 410. The direction defined by the vector 430 is determined by comparing dimensions of the palm triangle (or thumb triangle) in the 2D image of the hand to the dimensions of a trained representation of the palm triangle (or thumb triangle) such as the dimensions discussed above with reference to FIG. 3. An orientation of the finger pose plane 405 is determined by a vector 435, which is defined as a vector that is normal to the vector 430 and in the finger pose plane 405. A 3D pose of the finger in a 2D image is generated by rotating the skeleton model 415 of the finger based on the orientations determined by the vectors 430, 435.

Figure 5:
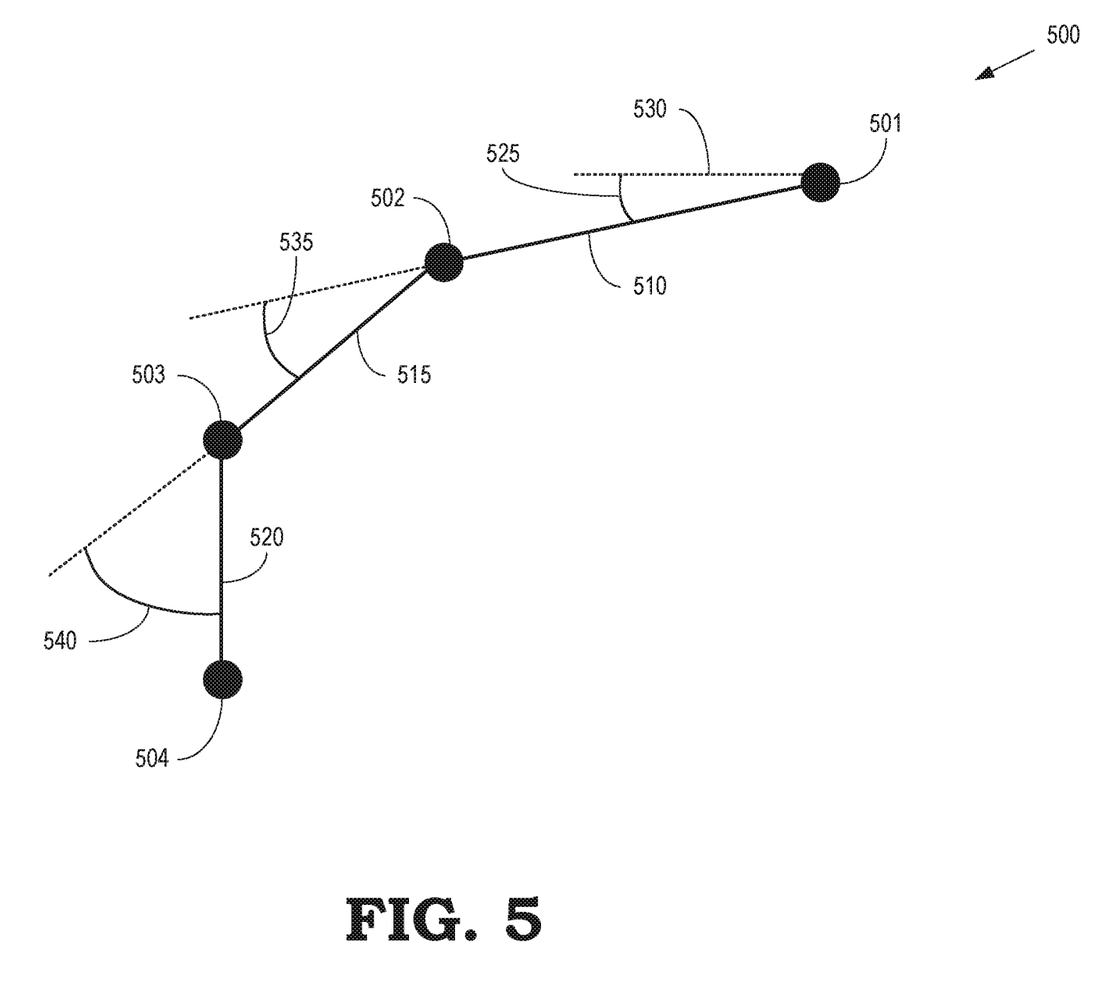
FIG. 5 illustrates a skeleton model of a finger in a finger pose plane according to some embodiments.

FIG. 5 illustrates a skeleton model 500 of a finger in a finger pose plane according to some embodiments. The skeleton model 500 represent some embodiments of the skeleton model 415 shown in FIG. 4. The skeleton model 500 also represents portions of some embodiments of the skeleton model 110 shown in FIG. 1 and the skeleton model 210 shown in FIG. 2. The skeleton model 500 includes a palm knuckle 501, a first joint knuckle 502, a second joint knuckle 503, and a fingertip 504. The skeleton model 500 is characterized by a length of a phalanx 510 between the palm knuckle 501 and the first joint knuckle 502, a length of a phalanx 515 between the first joint knuckle 502 and the second joint knuckle 503, and a link of a phalanx 520 between the second joint knuckle 503 and the fingertip 504.

Values of the lengths of the phalanxes 510, 515, 520 are learned from a set of training images of a hand that is held in a set of training poses. In some embodiments, the values of the lengths of the phalanxes 510, 515, 520 are learned by extracting keypoints corresponding to palm knuckles, joint knuckles, and fingertips from the set of training images. The keypoints are filtered for outliers using techniques such as median or median absolute deviation to find and reject the outlier keypoints. Techniques including quadratic programming are then used to fit values of the lengths to the displacements of the keypoints in the set of training images.

A location of the fingertip 504 relative to the palm knuckle 501 is determined by a set of angles at the palm knuckle 501, the first joint knuckle 502, and the second joint knuckle 503. A first angle 525 represents an angle between the phalanx 510 and a plane of a palm triangle (or a thumb triangle), as indicated by the dashed line 530. A second angle 535 represents an angle between the phalanx 510 and the phalanx 515. A third angle 540 represents an angle between the phalanx 515 and the phalanx 520. Ranges of the angles 525, 535, 540 are anatomically constrained to a limited set of values, which is substantially the same with minor variations for different hands. For example, the ranges of the angles 525, 535, 540 are constrained to lie between 0° and 90°.

Figure 6:
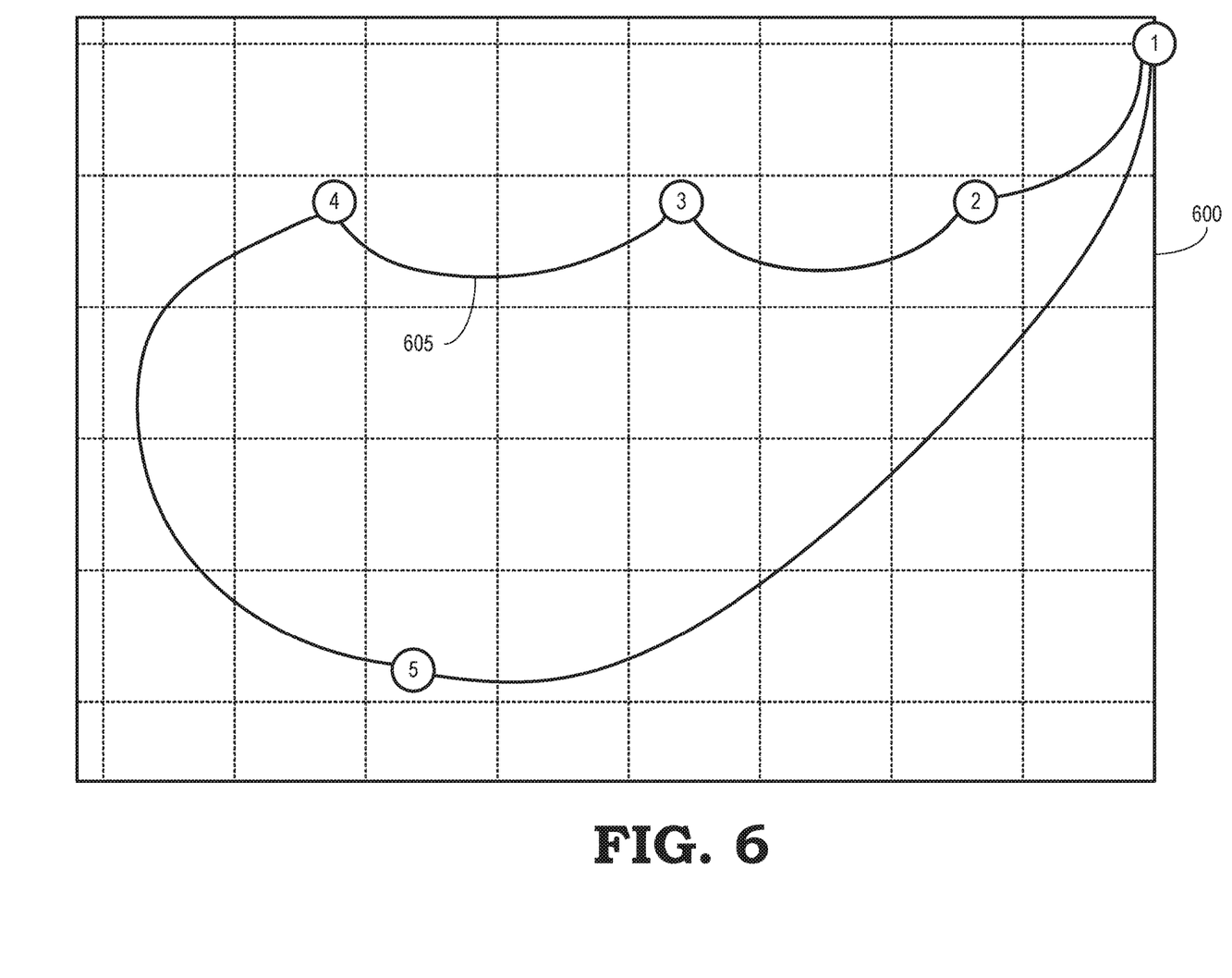
FIG. 6 is a representation of a lookup table (LUT) that is used to look up 2D coordinates of a finger in a finger pose plane based on a relative location of a palm knuckle and a tip of the finger according to some embodiments.

FIG. 6 is a representation of an LUT 600 that is used to look up 2D coordinates of a finger in a finger pose plane based on a relative location of a palm knuckle and a tip of the finger according to some embodiments. The vertical axis of the LUT 600 represents a displacement of the tip of the finger relative to the palm knuckle in the vertical direction. The horizontal axis of the LUT represents a displacement of the tip of the finger relative to the palm knuckle in the horizontal direction. The closed curve 605 represents an outer boundary of the possible locations of the tip of the finger relative to the palm knuckle. The closed curve 605 is therefore determined based on lengths of the phalanxes of the finger and anatomical constraints on relative angles between the phalanxes due to limits on the range of motion of the corresponding joints. Locations within the closed curve 605 represent possible relative positions of the tip of the finger and the palm knuckle.

The LUT 600 for a particular hand is determined using a set of training images of the hand in a predetermined set of poses. In order to account for the differing lengths of the phalanxes in different hands, the set of training images is defined to include locations near the boundary defined by the closed curve 605. A large portion of the locations within the closed curve 605 uniquely determine 2D coordinates of the finger. However, some embodiments of the closed curve 605 include a small set of degenerate cases that map a single point within the closed curve 605 to more than one set of 2D coordinates of the finger. The degeneracy between the different sets of 2D coordinates can be broken using other information, such as a previous position of the finger, depth information, shadow or lighting information, and the like.

In some embodiments, information in the LUT 600 is used to determine when two or more dissimilar poses result in the same or a similar set of projected 2D coordinates of the finger, e.g. one or more of the keypoints that are derived from the LUT 600 for one 3D pose are the same or similar to one or more of the keypoints that are derived from the LUT 600 for another 3D pose. A signal can then be generated to identify the dissimilar poses that have the same or similar projected 2D coordinates. The LUT 600 can also be used to convert 2D labels to 3D poses, e.g., of a hand, without gathering new data. In some embodiments, a confidence score is derived for the dissimilar poses that can result from the same or similar set of projected 2D coordinates. For example, a distance from a current pose to a most distant pose that has the same or similar 2D coordinates is used to generate a confidence score, such as a high confidence score if the distance is zero (or less than a threshold distance) and a low confidence score if the distance is greater than the threshold distance. In some embodiments, the dissimilar poses are disambiguated on the basis of the confidence scores for the keypoints or 2D coordinates that generate the dissimilar poses. For example, an image of a human being is used in some cases to check or confirm that the 3D lift of the 3D pose from the 2D labels is correct. The image can also be used to generate more accurate data by picking among different possible solutions.

Figure 7:
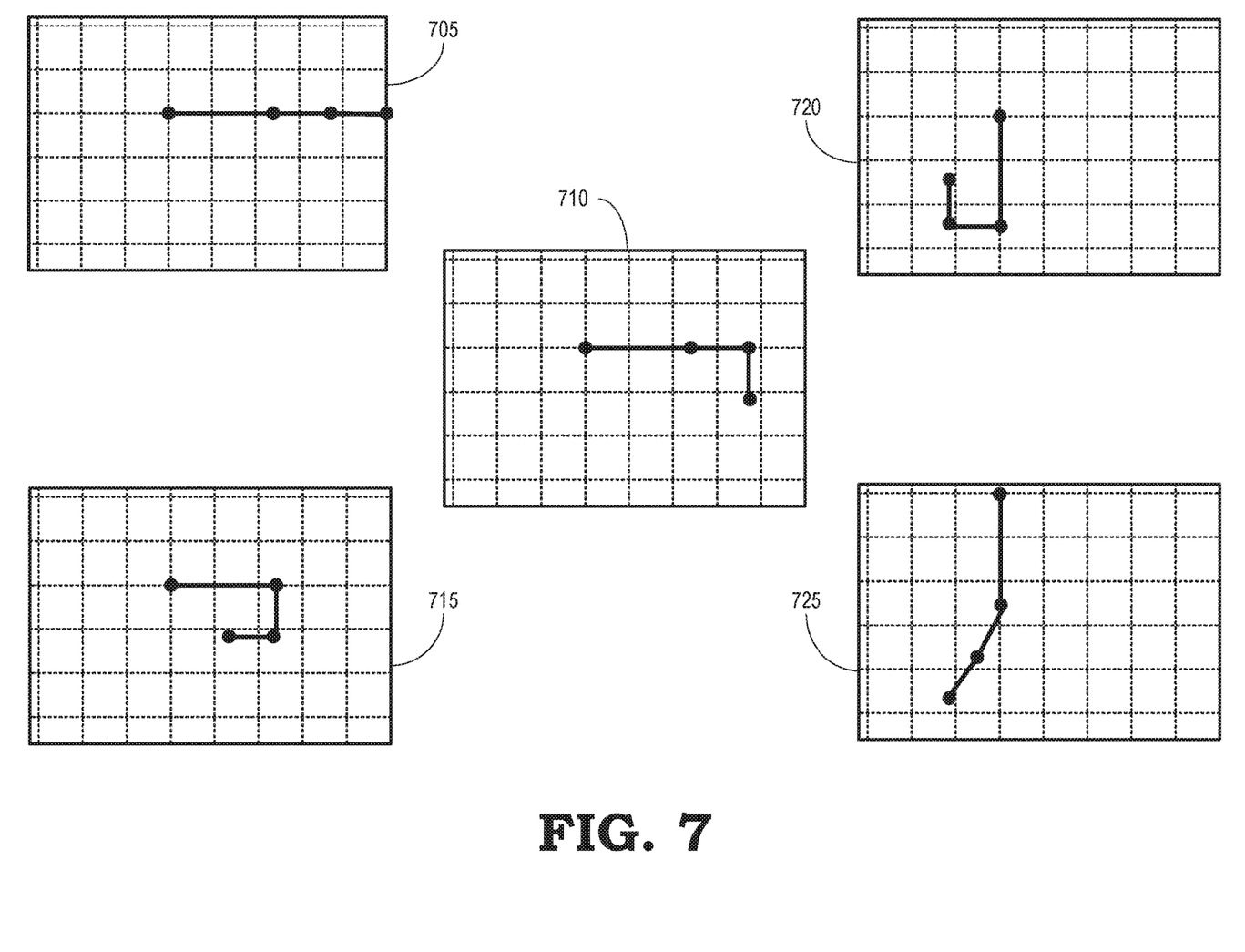
FIG. 7 illustrates the 2D coordinates of fingers having a relative position of the fingertip and palm knuckle indicated by the circles shown in FIG. 6 according to some embodiments.

FIG. 7 illustrates the 2D coordinates of fingers having a relative position of the fingertip and palm knuckle indicated by the circles 1, 2, 3, 4, and 5 in FIG. 6 according to some embodiments. The circle 1 indicates a relative position between a tip of the finger and the palm knuckle that corresponds to an extended finger, as shown in the skeleton model 705. The circle 2 indicates a relative position between the tip and the palm knuckle that corresponds to the tip of the finger being bent at 90° with respect to a second joint of the finger, as shown in the skeleton model 710. The circle 3 indicates a relative position between the tip and the palm knuckle that corresponds to the tip being curled up under a horizontally extended phalanx that connects the palm knuckle and the first joint, as indicated by the skeleton model 715. The circle 4 indicates a relative position between the tip and the palm knuckle that corresponds to the tip being curled up adjacent a vertically extended phalanx that connects the palm knuckle and the first joint, as indicated by the skeleton model 720. The circle 5 indicates a relative position between the tip and the palm knuckle that corresponds to the finger being extended vertically downward, as indicated by the skeleton model 725.

Figure 8:
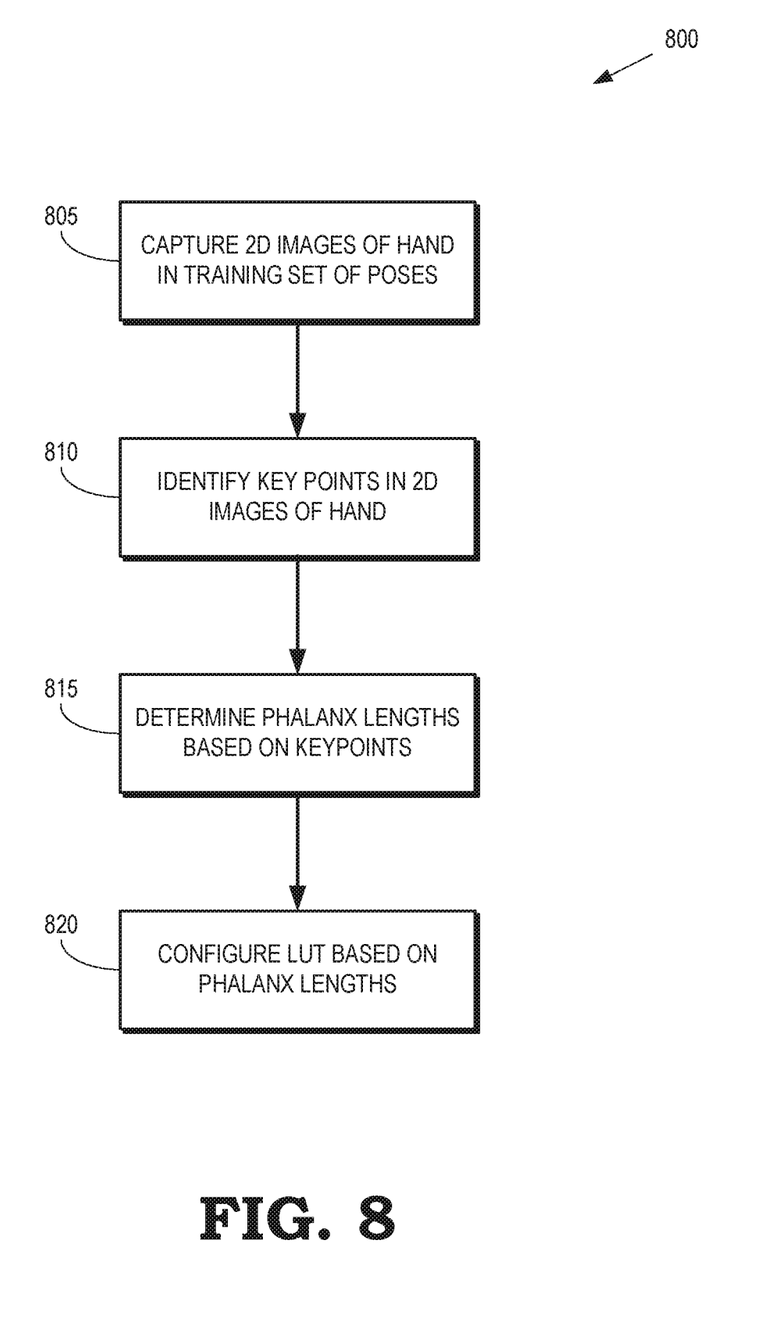
FIG. 8 is a flow diagram of a method of configuring an LUT that maps relative positions of the tip of a finger and a palm knuckle to 2D coordinates of the finger according to some embodiments.

FIG. 8 is a flow diagram of a method 800 of configuring an LUT that maps relative positions of the tip of a finger and a palm knuckle to 2D coordinates of the finger according to some embodiments. The method 800 is used to train some embodiments of the LUTs 230 shown in FIG. 2 and the LUT 600 shown in FIG. 6. The method 800 is therefore performed by some embodiments of the processor 225 shown in FIG. 2.

At block 805, 2D images of a hand positioned in a training set of poses are captured. For example, the 2D images can be captured by the camera 215 shown in FIG. 2. The 2D images are stored in a memory such as the memory 220 shown in FIG. 2.

At block 810, the processor identifies keypoints in the 2D images of the hand. As discussed herein, the keypoints include locations of tips of the fingers and the thumb, joints that connect phalanxes of the fingers and the thumb, palm knuckles that represent a point of attachment of each finger and the thumb to the palm of the hand, and a wrist location that indicates a point of attachment of the hand to the user's forearm. Techniques for identifying keypoints in 2D images are known in the art and in the interest of clarity are not discussed further herein.

At block 815, the processor determines lengths of phalanxes in the fingers and thumb of the hand based on the keypoints, e.g., using quadratic programming as discussed herein.

At block 820, the processor configures the LUT based on the length of the phalanxes and other anatomical constraints on the relative positions of the fingertip and the palm knuckle. The processor stores the LUT in a memory such as the memory 220 shown in FIG. 2.

Figure 9:
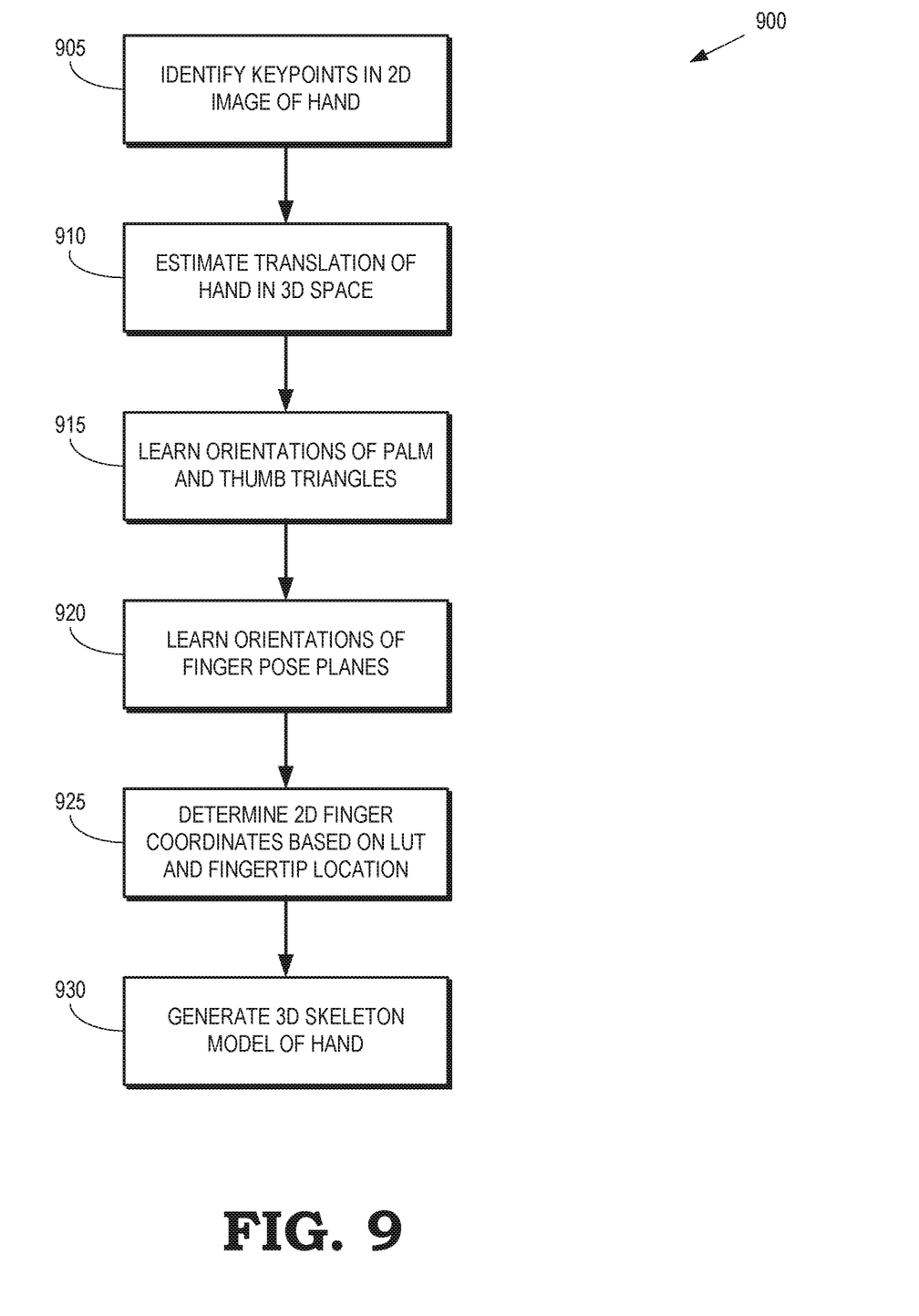
FIG. 9 is a flow diagram of a method of lifting a 3D pose of a hand from a 2D image of the hand according to some embodiments.

FIG. 9 is a flow diagram of a method 900 of lifting a 3D pose of a hand from a 2D image of the hand according to some embodiments. The method 900 is implemented in some embodiments of the processing system 200 shown in FIG. 2. In the illustrated embodiment, LUTs that map relative locations of tips of the fingers and thumb to corresponding palm knuckles has been generated for the hand, e.g., according to some embodiments of the method 800 shown in FIG. 8. Thus, other parameters that represent a skeleton model of the hand have also been determined, such as lengths of the phalanxes, parameters that define a palm triangle for the hand, and parameters that define a thumb triangle for the hand.

At block 905, a processor identifies keypoints in the 2D image of the hand. The processor then estimates a translation of the hand in 3D space based on the keypoints. Some embodiments of the processor estimate the translation by comparing the parameters that define the skeleton model of the hand to the relative values of corresponding parameters in the 2D image. For example, the processor can compare lengths of the phalanxes of the fingers and thumb in the skeleton model to lengths of the corresponding phalanxes in the 2D image to account for perspective projection and de-project the 2D image of the hand.

At block 915, the processor learns orientations of the palm triangle and the thumb triangle. Some embodiments of the processor learned the orientations of the palm triangle and the thumb triangle by comparing the parameters that define the palm and thumb triangles to portions of the 2D image. The orientations of the palm triangle and the thumb triangle are characterized by corresponding vectors, which are defined to lie in a direction normal to the planes of the palm triangle and the thumb triangle.

At block 920, the processor learns the orientations of the finger pose planes for the fingers and the thumb. The orientations of the finger pose planes are characterized by corresponding vectors, which are normal to the vectors that define the corresponding palm triangle or thumb triangle and which lie in the corresponding finger pose plane.

At block 925, the processor determines the 2D finger coordinates of the fingers and thumb based on the LUTs and relative locations of the tips of the fingers and the corresponding palm knuckles.

At block 930, the processor generates a 3D skeleton model that represents the 3D pose of the hand. To generate the 3D skeleton model, the processor rotates the 2D coordinates of the fingers and thumb based on the orientations of the palm triangle and the thumb triangle, respectively. The 3D skeleton model is determined by combining the palm triangle, the orientation of the palm triangle, the thumb triangle, the orientation of the thumb triangle, and the rotated 2D finger coordinates of the fingers and thumb.

Figure 10:
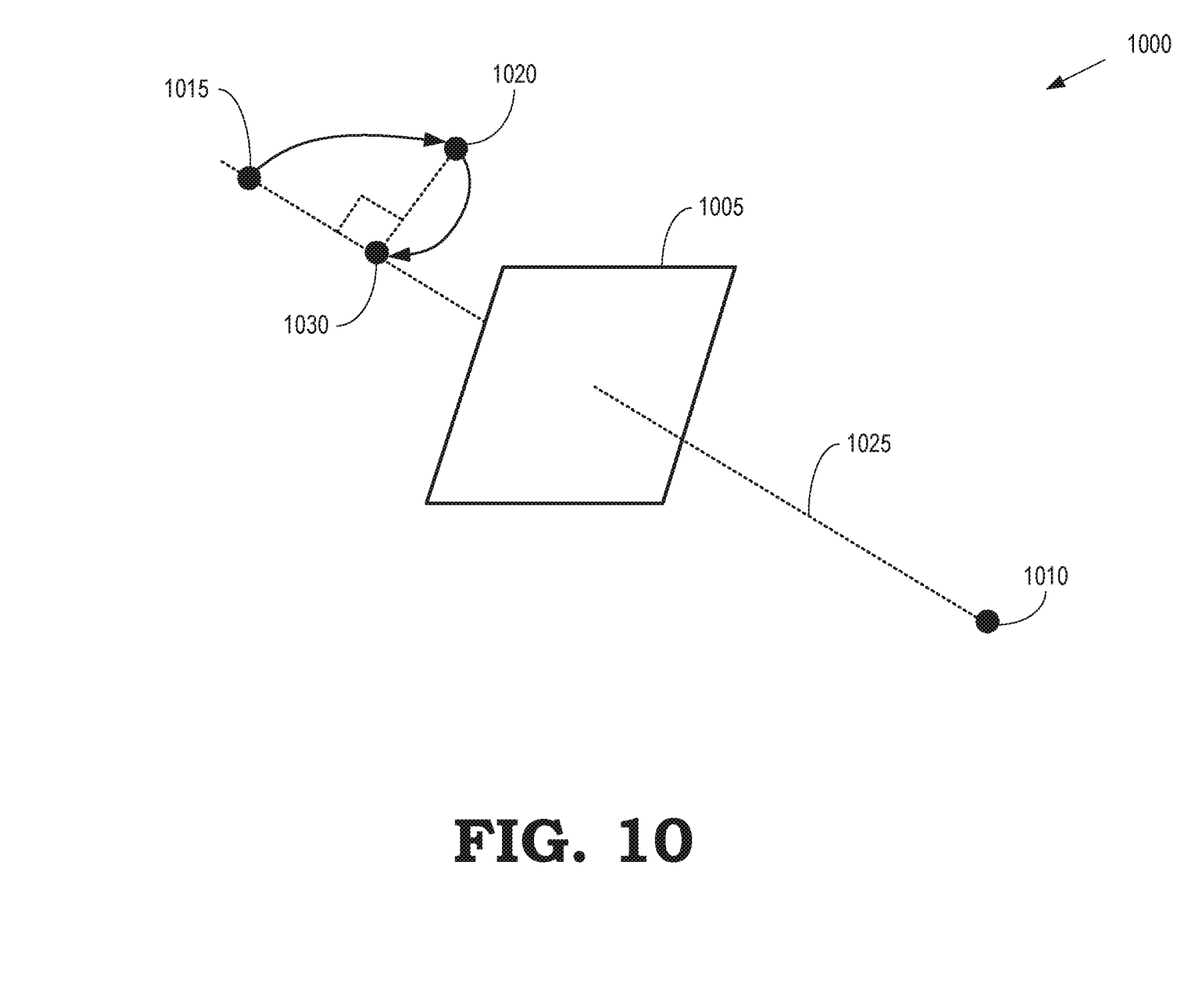
FIG. 10 is an illustration of iteratively de-denoising 3D keypoints that are listed from a 2D image of a hand according to some embodiments.

FIG. 10 is an illustration 1000 of iteratively de-denoising 3D keypoints that are listed from a 2D image of a hand according to some embodiments. The iterative process depicted in the illustration 1000 is implemented in some embodiments of the processing system 200 shown in FIG. 2. The illustration 1000 shows an image plane 1005 of a camera such as the camera 215 shown in FIG. 2. Images captured by the camera are projected onto the image plane 1005. Characteristics of the camera also determine a vanishing point 1010 that is an abstract point on the image plane 1005 where 2D projections of parallel lines in 3D space appear to converge.

Initially, a keypoint 1015 is extracted from the 2D image. In the illustrated embodiment, the 2D image is a noisy image and the initial estimate of the keypoint 1015 is not necessarily at the correct position in the image of the hand. A 3D skeleton model of the hand is lifted from the 2D image on the basis of the noisy keypoint 1015, as well as other potentially noisy keypoints (not shown in FIG. 10) that are extracted from the 2D image. For example, the 3D skeleton model of the hand is lifted according to some embodiments of the method 800 shown in FIG. 8 and the method 900 shown in FIG. 9. The 3D skeleton model of the hand is used to determine a 3D keypoint 1020 that corresponds to the same location in the hand as the keypoint 1015.

The 3D keypoint 1020, which is referred to herein as a skeleton-compliant keypoint, is not necessarily consistent with the perspective projection of the initial keypoint 1015 because the skeleton-compliant keypoint 1020 is not necessarily on a line 1025 between the initial keypoint 1015 and the vanishing point 1010. A modified 3D keypoint 1030 is therefore determined by projecting the skeleton-compliant keypoint 1020 onto the line 1025. The process is then iterated by updating the value of the initial keypoint 1015 by setting it equal to the modified 3D keypoint 1030, which is referred to herein as a camera-compliant keypoint. The process is iterated until a convergence criterion for the keypoint (and any other noisy keypoints in the 2D image) is satisfied.

Figure 11:
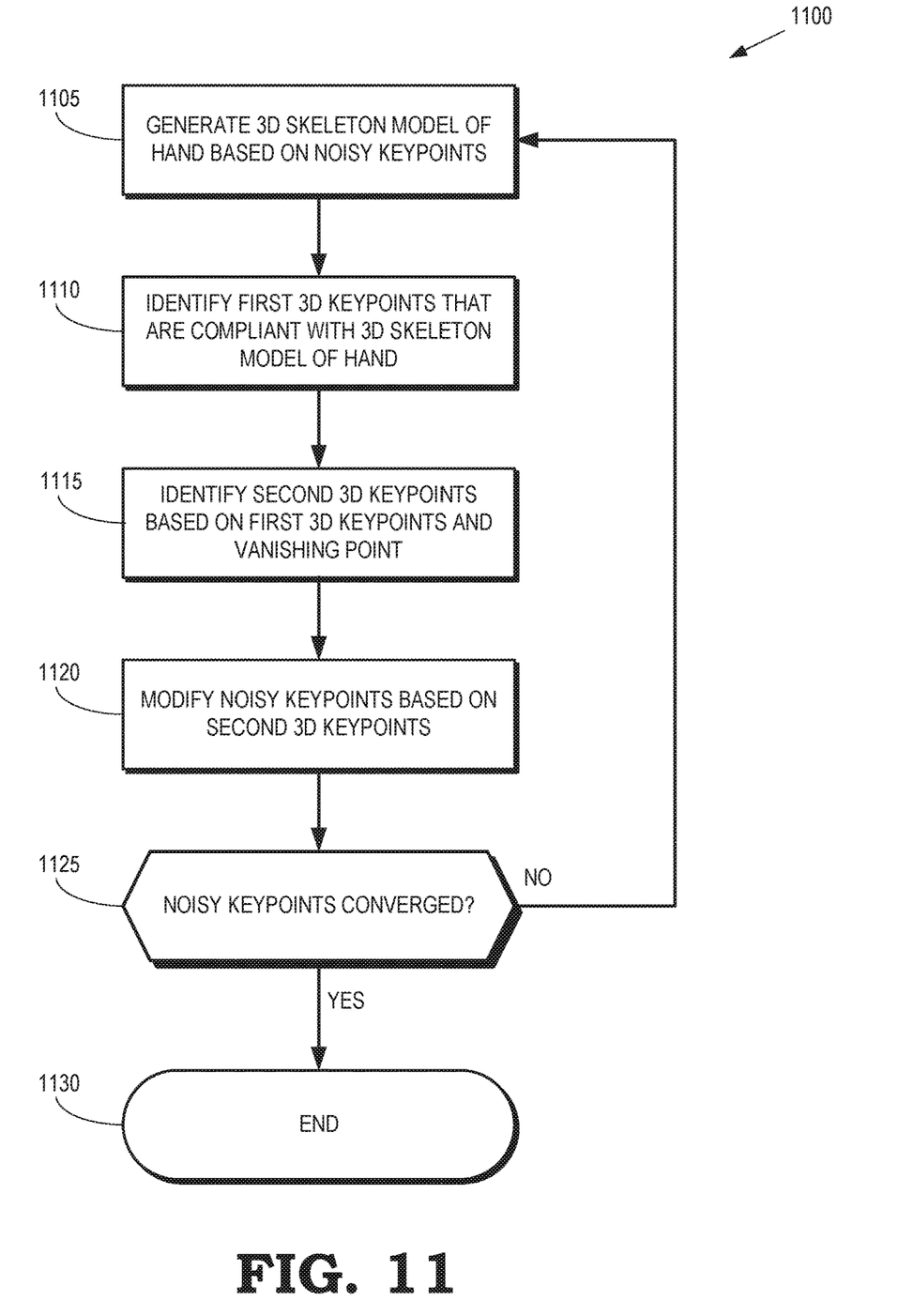
FIG. 11 is a flow diagram of a method of denoising keypoints extracted from a 2D image of a hand according to some embodiments.

FIG. 11 is a flow diagram of a method 1100 of denoising keypoints extracted from a 2D image of a hand according to some embodiments. The method 1100 is performed in some embodiments of the processing system 200 shown in FIG. 2.

At block 1105, a processor generates a 3D skeleton model of a hand based on noisy keypoints extracted from a 2D image. In some embodiments, the 3D skeleton model is generated according to embodiments of the method 800 shown in FIG. 8 and the method 900 shown in FIG. 9.

At block 1110, the processor identifies a first set of 3D keypoints that are compliant with the 3D skeleton model of the hand. For example, the first set of 3D keypoints represents keypoints corresponding to tips of the fingers and thumb, joints of the fingers and thumb, palm knuckles of the fingers and thumb, and a wrist location defined by the 3D skeleton model of the hand. In some embodiments, the first set of 3D keypoints includes the skeleton-compliant keypoint 1020 shown in FIG. 10.

At block 1115, the processor identifies second 3D keypoints based on the first 3D keypoints and a vanishing point associated with the image. As discussed herein, the vanishing point is determined based on characteristics of a camera that acquired the 2D image. In some embodiments, the second set of 3D keypoints includes the camera-compliant keypoint 1030 shown in FIG. 10.

At block 1120, the processor modifies the noisy keypoints extracted from the 2D image based on the second set of 3D keypoints. For example, values of the noisy keypoints are updated to be equal to corresponding values of the second set of 3D keypoints.

At decision block 1125, the processor determines whether the values of the noisy keypoints have converged, e.g., based on convergence criteria for the noisy keypoints. If not, the method 1100 flows to block 1105 and an updated 3D skeleton model is generated on the basis of the modified values of the noisy keypoints. If the processor determines that the values have converged, the method flows to termination block 1130 and ends.

In some embodiments, certain aspects of the techniques described above are implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
identifying, at a processor, keypoints on a hand in a two-dimensional (2D) image captured by a camera;
determining, at the processor, a three-dimensional (3D) pose of the hand using locations of the keypoints to access lookup tables (LUTs) that represent potential 3D poses of the hand as a function of the locations of the keypoints;
determining a set of coordinates of a set of hand features associated with the hand using a set of training images, at least one LUT, and at least one hand feature triangle associated with the hand that has one or more vertices at one or more hand features of the set of hand features associated with the hand, wherein the at least one hand feature triangle comprises:
a thumb triangle that has vertices at a wrist location, a palm knuckle of a thumb of the hand, and a palm knuckle of an index finger; and
a palm triangle that has a vertex at the wrist location, wherein the vertex is opposite a side of the palm triangle that includes palm knuckles of fingers of the hand; and
determining, based on the set of training images, parameters that define the thumb triangle that has vertices at the wrist location, the palm knuckle of the thumb, and the palm knuckle of the index finger.

2. The method of claim 1, wherein the keypoints comprise locations of tips of fingers and the thumb of the hand, joints that connect phalanxes of the fingers and the thumb, palm knuckles that represent a point of attachment of the fingers and the thumb to a palm of the hand, and the wrist location that indicates a point of attachment of the hand to a forearm.

3. The method of claim 2, wherein the LUTs comprise finger pose LUTs that represent 2D coordinates of the fingers and the thumb in corresponding finger pose planes as a function of the locations of the tips of the fingers or thumb relative to corresponding palm knuckles of the fingers or thumb.

4. The method of claim 3, further comprising:
generating the finger pose LUTs based on the set of training images of the hand in a plurality of 3D training poses.

5. The method of claim 4, wherein generating the finger pose LUTs comprises determining lengths of the phalanxes of the fingers and the thumb from the set of training images.

6. The method of claim 5, wherein generating the finger pose LUTs comprises generating the finger pose LUTs based on the lengths of the phalanxes and anatomical constraints on ranges of motions of the joints that connect the phalanxes.

7. The method of claim 6, further comprising:
identifying two or more potential 3D poses that have similar keypoints determined based on the finger pose LUTs.

8. The method of claim 6, further comprising:
determining, based on the set of training images, parameters that define the palm triangle that has the vertex at the wrist location, wherein the vertex is opposite the side of the palm triangle that includes the palm knuckles of the fingers of the hand.

9. The method of claim 1, wherein identifying the keypoints comprises identifying 3D locations of noisy keypoints in the 2D image of the hand, and wherein identifying the 3D pose of the hand comprises generating a skeleton model that represents the 3D pose of the hand based on the noisy keypoints.

10. The method of claim 9, further comprising:
generating skeleton-compliant keypoints based on the skeleton model;
modifying the skeleton-compliant keypoints based on a line connecting corresponding noisy keypoints and a vanishing point associated with the 2D image;
setting the noisy keypoints equal to the modified skeleton-compliant keypoints; and
iterating until the noisy keypoints satisfy convergence criteria.

11. A method comprising:
determining, at a processor, based on a set of training images of a hand in a plurality of 3D training poses, hand feature triangle parameters that define a thumb triangle that has vertices at a wrist location, a palm knuckle of a thumb, and a palm knuckle of an index finger and hand feature triangle parameters that define a palm triangle that has a vertex at the wrist location and a side of the palm triangle comprising palm knuckles of fingers of the hand opposite to the vertex at the wrist location;
identifying keypoints on a hand in a two-dimensional (2D) image captured by a camera, wherein the keypoints are based on the hand feature triangle parameters; and
determining, at the processor, a three-dimensional (3D) pose of the hand in the 2D image using locations of the keypoints to access one or more lookup tables (LUTs) that represent potential 3D poses of the hand as a function of the locations of the keypoints.

12. The method of claim 11, wherein determining the 3D pose of the hand comprises determining 2D coordinates of the fingers and the thumb from the finger pose LUTs based on relative locations of corresponding fingertips and palm knuckles of the fingers and the thumb.

13. The method of claim 12, wherein determining the 3D pose of the hand comprises determining orientations of a palm triangle and the thumb triangle from the 2D image.

14. The method of claim 13, wherein determining the 3D pose of the hand comprises rotating the 2D coordinates of the fingers and the thumb based on the orientations of the palm triangle and the thumb triangle, respectively.

15. An apparatus comprising:
a camera configured to acquire two-dimensional (2D) images of a hand; and
a processor configured to:
identify keypoints on a hand in a 2D image;
determine a three-dimensional (3D) pose of the hand using locations of the keypoints to access lookup tables (LUTs) that represent potential 3D poses of the hand as a function of the locations of the keypoints; and
determine a set of coordinates of a set of hand features associated with the hand using a set of training images, at least one LUT, and at least one hand feature triangle associated with the hand that has one or more vertices at one or more hand features of the set of hand features associated with the hand, wherein the at least one hand feature triangle comprises:
- a thumb triangle that has vertices at a wrist location, a palm knuckle of a thumb of the hand, and a palm knuckle of an index finger; and
- a palm triangle that has a vertex at the wrist location, wherein the vertex is opposite a side of the palm triangle that includes palm knuckles of fingers of the hand, wherein the processor is configured to determine, based on the set of training images, parameters that define the thumb triangle that has vertices at the wrist location, the palm knuckle of the thumb, and the palm knuckle of the index finger.

16. The apparatus of claim 15, wherein the keypoints comprise locations of tips of fingers and the thumb of the hand, joints that connect phalanxes of the fingers and the thumb, the palm knuckles that represent a point of attachment of the fingers and the thumb to a palm of the hand, and the wrist location that indicates a point of attachment of the hand to a forearm.

17. The apparatus of claim 16, wherein the LUTs comprise finger pose LUTs that represent 2D coordinates of the fingers and the thumb in corresponding finger pose planes as a function of the locations of the tips of the fingers or thumb relative to the corresponding palm knuckles of the fingers or thumb.

18. The apparatus of claim 17, wherein the processor is configured to:
- generate the finger pose LUTs based on the set of training images of the hand in a plurality of 3D training poses; and
- store the finger pose LUTs in a memory.

19. The apparatus of claim 17, wherein the processor is configured to identify two or more potential 3D poses that have similar keypoints determined based on the finger pose LUTs.

20. The apparatus of claim 17, wherein the processor is configured to determine lengths of the phalanxes of the fingers and the thumb from the set of training images.

21. The apparatus of claim 20, wherein the processor is configured to generate the finger pose LUTs based on the lengths of the phalanxes and anatomical constraints on ranges of motions of the joints that connect the phalanxes.

22. The apparatus of claim 21, wherein the processor is configured to determine, based on the set of training images, parameters that define the palm triangle that has the vertex at the wrist location, wherein the vertex is opposite the side of the palm triangle that includes the palm knuckles of the fingers.

23. The apparatus of claim 15, wherein the processor is configured to determine 2D coordinates of the fingers and the thumb from the finger pose LUTs based on relative locations of corresponding fingertips and palm knuckles of the fingers and the thumb.

24. The apparatus of claim 23, wherein the processor is configured to determine orientations of the palm triangle and the thumb triangle from the 2D image.

25. The apparatus of claim 24, wherein the processor is configured to rotate the 2D coordinates of the fingers and the thumb based on the orientations of the palm triangle and the thumb triangle, respectively.

26. The apparatus of claim 15, wherein the processor is configured to identify 3D locations of noisy keypoints in the 2D image of the hand, and wherein the processor is configured to generate a skeleton model that represents the 3D pose of the hand based on the noisy keypoints.

27. A method comprising:
- identifying, at a processor, keypoints on a body part in a two-dimensional (2D) image captured by a camera; and
- determining, at the processor, a three-dimensional (3D) pose of the body part using locations of the keypoints to access lookup tables (LUTs) that represent potential 3D poses of the body part as a function of the locations of the keypoints; and
- determining a set of coordinates of a set of body part features associated with the body part using a set of training images, at least one LUT, and at least one body part feature triangle associated with the body part that has one or more vertices at one or more body part features of the set of body part features associated with the body part, wherein the at least one body part feature triangle comprises:
  - a thumb triangle that has vertices at a wrist location, a palm knuckle of a thumb of a hand, and a palm knuckle of an index finger; and
  - a palm triangle that has a vertex at the wrist location, wherein the vertex is opposite a side of the palm triangle that includes palm knuckles of fingers of the hand; and
- determining, based on the set of training images, parameters that define the thumb triangle that has vertices at the wrist location, the palm knuckle of the thumb, and the palm knuckle of the index finger.

28. The method of claim 27, wherein the body part comprises at least one of the hand, a foot, an arm, a leg, and a head.

29. An apparatus, comprising a processor configured to:
- identify keypoints on a hand in a 2D image acquired from an image capture device;
- determine a three-dimensional (3D) pose of the hand using locations of the keypoints to access lookup tables (LUTs) that represent potential 3D poses of the hand as a function of the locations of the keypoints; and
- determine a set of coordinates of a set of hand features associated with the hand using a set of training images, at least one LUT, and at least one hand feature triangle associated with the hand that has one or more vertices at one or more hand features of the set of hand features associated with the hand, wherein the at least one hand feature triangle comprises:
  - a thumb triangle that has vertices at a wrist location, a palm knuckle of a thumb of the hand, and a palm knuckle of an index finger; and
  - a palm triangle that has a vertex at the wrist location, wherein the vertex is opposite a side of the palm triangle that includes palm knuckles of fingers of the hand, wherein the processor is configured to determine, based on the set of training images, parameters that define the thumb triangle that has vertices at the wrist location, the palm knuckle of the thumb, and the palm knuckle of the index finger.

* * * * *